United States Patent [19]

Wen

[11] Patent Number: 5,404,902

[45] Date of Patent: Apr. 11, 1995

[54] ISOLATION AUTOMATIC CONTROL VALVE

[76] Inventor: Bangyan Wen, P.O. Box 5501 (Wansong Road), Ruian, Zhejiang, China

[21] Appl. No.: 174,612

[22] Filed: Dec. 28, 1993

Related U.S. Application Data

[63] Continuation of Ser. No. 909,103, Jul. 2, 1992, abandoned.

[30] Foreign Application Priority Data

Jul. 2, 1991 [CN] China ............................. 91104261.X

[51] Int. Cl.⁶ ............................................. F16K 31/14
[52] U.S. Cl. ................................. 137/489; 137/490; 137/625.64; 251/26; 251/30.02
[58] Field of Search ................... 137/489, 490, 625.64; 251/26, 30.02

[56] References Cited

U.S. PATENT DOCUMENTS 3,902,526 9/1975 Brake et al. ..................... 137/625.64
4,816,083 3/1989 Bangyan .

*Primary Examiner*—Gerald A. Michalsky

*Attorney, Agent, or Firm*—Merchant, Gould, Smith, Edell, Welter & Schmidt

[57] ABSTRACT

An isolation automatic control valve is formed by disposing an isolation valve of very simple structure in the inlet and outlet passages of a main valve or in the passage joining a main valve and its pilot valve, which not only controls normal operation during automatic controlling but also can isolate the main valve from the pilot valve for on-line maintenance while simultaneously controlling operation of the main valve manually or automatically. The isolation valve includes a throttling function to enable the main valve to acquire various control parameters. The present invention enumerates nine embodiments of different pressure, flow and direction control valves, each being applicable in various fields of general purpose valves, hydropneumatic valves and instrument valves. The present invention exhibits compact structure, simple piping, adjustable parameters and convenience in operation. Furthermore, the present invention puts forward a pressure automatic control valve having a simplified new structure with manual pressure adjusting and throttling features.

3 Claims, 18 Drawing Sheets

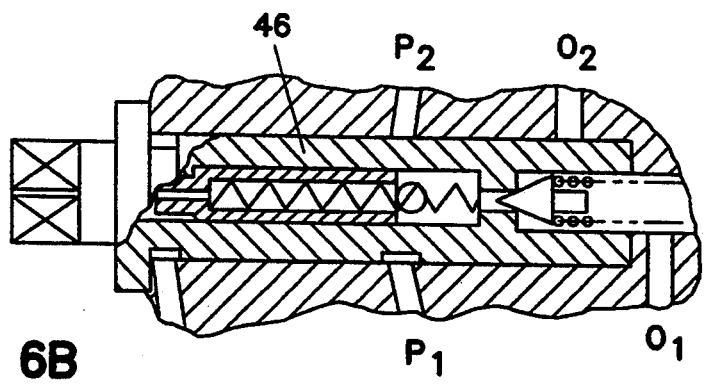
FIG. 6B
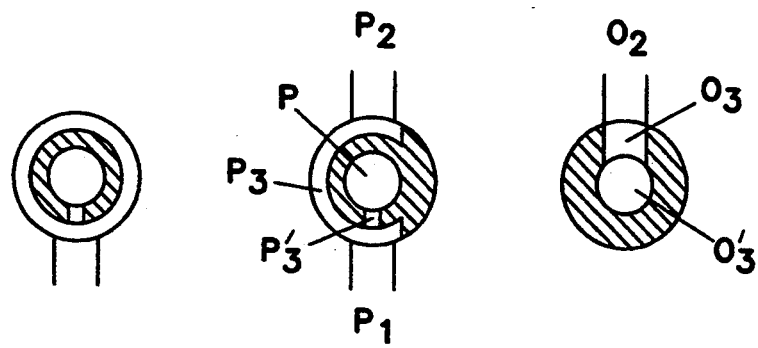
FIG. 6D
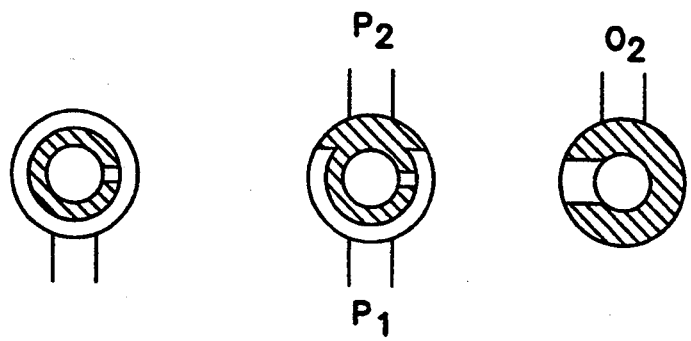
FIG. 6E
FIG. 6C
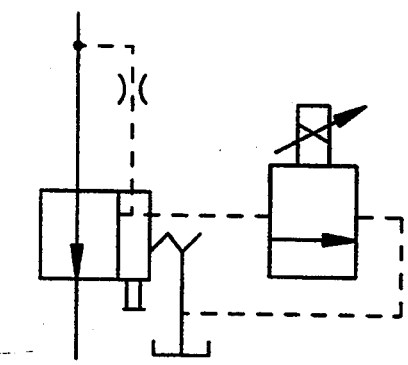

ISOLATION AUTOMATIC CONTROL VALVE

This is a continuation of application Ser. No. 07/909,103, filed Jul. 2, 1992, now abandoned.

BACKGROUND OF THE INVENTION

The present invention relates to an automatic control valve with an isolation valve, and particularly relates to a valve able to isolate a pilot valve which may be controlled manually or by automatic piloting.

The present invention relates further to a pressure control valve which combines a damping throttle valve with a manual adjusting valve.

Various automatic control valves are extensively used in industry and may be classified as general purpose valves, hydropneumatic valves and instrument valves according to their field of usage. They can make use of various power sources, including the energy of the medium itself for actuating the valve, to meet demands for pressure, flow and direction. However, failure or abnormal operation of any automatic valve will result from changes in external conditions. For example, electric power cutoff, overvoltage or under voltage, or excessively high or low pipeline pressure will cause magnetic valves to fail. For an automatic valve in the field of general purpose valves and instrument valves, the conventional method for solving the aforementioned problems is to mount an automatic control valve using a by-pass isolation method. A by-pass isolation method is shown in FIG. 10 of the accompanying drawings, wherein (91) is an automatic control valve, (92) is a by-pass manual valve, (93) and (94) are isolation manual valves. Such a pipeline can be controlled manually and repaired on-line when the automatic control valve is out of order. The so-called on-line repair guarantees that the whole system will work without interruption while the automatic control valve is opened or dismantled for repair. This method is utilized at the expense of occupying more space and an increase of cost. When using an automatic control valve in a hydropneumatic system where space is limited, such a method is generally not used and repair has to be done by shutting down the entire system.

The automatic control valves used in industry are mostly of a pilot type which have the distinct advantage in using a smaller pilot valve to control a larger main valve, so as to decrease volume, reduce weight and lower consumption and cost. However, this kind of pilot type automatic control valve often suffers failures at the pilot valve side. In view of such an analysis, U.S. Pat. No. 4,816,083 entitled "Multifunctional Electromagnetic Valve Assembly", has put forward a new concept that two crews are used to isolate the pilot valve which makes on-line repair possible and thus is well received in engineering circles. However, such a structure is not the simplest, and manual operation is not yet convenient. And, this concept is limited to the field of magnetic valves.

On the other hand, existing automatic control valves in hydropneumatic system have a built-in manual pressure adjusting valve, a damping throttle valve and a pressure compensating throttle valve which are disposed separately, resulting in numerous parts, bulky volume and high cost and thus improvements are needed.

SUMMARY OF THE INVENTION

The present invention, in view of above-mentioned problems, puts forward a new concept for an automatic control valve with an isolation function.

One purpose of the present invention lies in isolating the main valve for maintenance and in manually operating an isolation valve to control the main valve.

The second purpose of the present invention lies in that the pilot valve is to be isolated first which can then be dismantled for maintenance, and the main valve can still be controlled manually or by automatic piloting with an isolation valve.

The third purpose of the present invention lies in enabling the isolation valve to have a throttling function by itself so as to be able to adjust parameters of actuating time and pressure of the main valve during automatic or manual control.

The fourth purpose of the present invention lies in simplifying and combining the structure of the manual pressure adjusting valve, damping throttle valve, and pressure compensating throttle valve of an automatic control valve of a hydropneumatic system and providing it with the function of an isolation pilot valve.

The fifth purpose of the present invention lies in providing an isolation valve with compactness in structure.

In short, the present invention lies in that the automatic control valve is controllable under emergency conditions, is capable of on-line maintenance and adjustable parameters, is compact in structure, providing a simple pipeline, and is convenient in operation.

The present invention, by the way, provides a magnetic overflow valve of compact structure with a damping throttle valve and a manual pressure adjusting valve.

The present invention is realized through the following technical schemes.

1. An isolation valve is disposed on the inlet and outlet passages of a main valve of an automatic control valve, or on a passage joining a main valve and a pilot valve.
2. The valve bodies of the isolation valve and the main valve are made integral, with a cylindrical chamber inside, and with an isolation valve core to fit precisely into the cylindrical chamber. Holes or slots are provided in the valve core in a position which guarantees an unimpeded passage of medium through the inlet and outlet passages of the main valve or between the main valve and the pilot valve. Turning or moving the isolation valve core to change its position relative to the valve body will close the open passages and isolate the main valve from the inlet and outlet passages or isolate the main valve from the pilot valve, thus enabling on-line maintenance of the main valve or pilot valve.
3. Under the isolated condition mentioned above, turning and moving the isolation valve core can also place it in several different positions as required, so that holes or slots in the valve core can keep the inlet and outlet passages in a communicated state, or keep the passage of the main valve originally in connection with the pilot valve partially or fully communicated, or totally closed. In other words, the isolation valve may be used to control the action of the main valve during on-line maintenance of the main valve or pilot valve.

4. A slight deviation of the isolation valve core from the positions as mentioned above in Schemes 2 and 3 will decrease the flowing area formed by holes or slots in the valve core as they mate with passages on the valve body and will have the effect of throttling so as to acquire different control parameters.

5. Spiral shaped, T-shaped or L-shaped guide slots may be defined in the isolation valve core, and a change of valve core position for controlling flow may be a combination mode of turning and moving.

6. A round hole may be defined along the longitudinal axis of the above-mentioned isolation valve core to serve as the valve seat of a manual pressure adjusting pilot valve or as the valve seat of a check valve built into the automatic control valve proper.

7. The valve core of the above-mentioned isolation valve may be composed of a sleeve with holes or slots and an inner core sliding in the sleeve. Turning or moving the sleeve will effect in the same manner an action of isolation and change of flow path, while simultaneously holes of the sleeve and the inner core may form a throttling opening as well, or the sleeve will serve concurrently as the valve seat of a manual pressure adjusting valve or a check valve. The structure of an automatic control valve with built-in throttle valve, pressure adjusting valve or check valve may be simplified in this way.

According to the above-mentioned technical schemes of the present invention, the structure of the manual pressure adjusting valve, damping throttle valve and pressure compensating throttle valve of the automatic control valve may be combined and simplified, even if the function of isolation is not considered.

It is evident from the above-mentioned technical schemes that the isolation valve put forward by the present invention possesses functions of isolation, direction switching, and throttling simultaneously. Therefore the advantage of the present invention is quite distinct. First of all, it provides a function of by-pass controllability and on-line maintenance to automatic control valves, it simplifies a pipeline, it facilitates operation and can meet emergency treatment under contingency. Next, it simplifies the structure of automatic control valves, up-grades their performance, can acquire different control parameters and lowers cost. Thirdly, the present invention belongs to a fundamentally important improvement on the prior art with a broad field of application and very distinct effect.

BRIEF DESCRIPTION OF THE DRAWINGS

In order to elaborate the present invention more clearly and specifically, embodiments of the present invention are further described in conjunction with the accompanying drawings.

FIGS. 6(a)–6(e) are schematic diagrams of the structure and isolation principles of the sixth embodiment of the present invention, an isolation pilot type valve with pressure compensating throttle valve and manual pressure adjusting valve;

DETAILED DESCRIPTION OF THE PREFERRED EMBODIMENTS

Figure 1A:
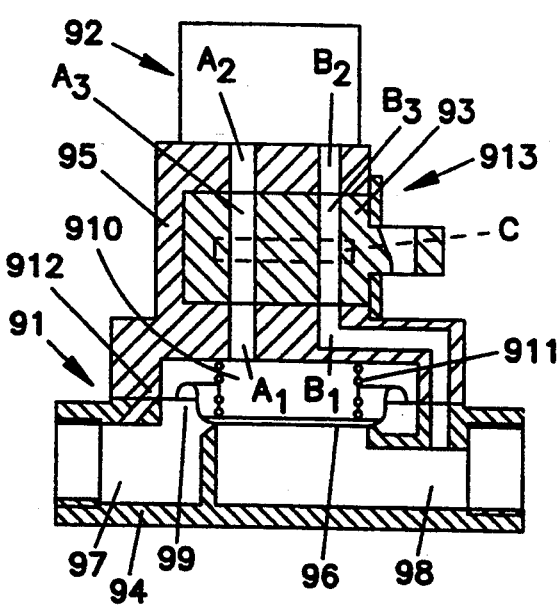
FIGS. 1(a)–1(e) are schematic diagrams of the structure and isolation principles of the first embodiment of the present invention—a two-position, two-way isolation automatic control valve.
Figure 1B:
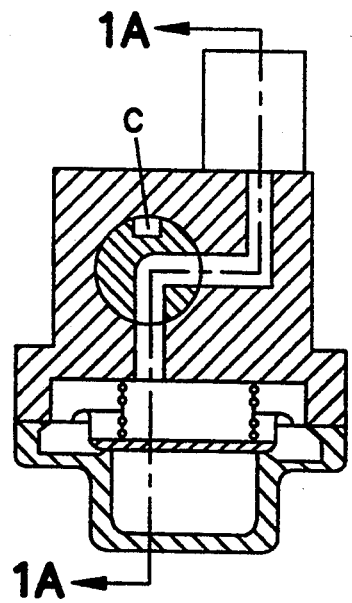

A description of each of the embodiments follows:

Referring to FIG. 1, the first embodiment is a two-position, two-way isolation automatic control valve. It consists of a main valve (91), a two-position, two-way pilot valve (92), and an isolation valve (93). The main valve is composed of a valve body (94), a valve cover (95) and a valve core (96). The valve core (96) separates a chamber formed by the valve body (94) and the valve cover (95) into two portions, of which one portion which communicates with an inlet (97) of the main valve (91) is a main chamber (99) and the other is a back chamber (910) facing the valve cover (95). When pressure in the main chamber (99) is less than or equal to the pressure in the back chamber (910), the valve core (96) under the action of a spring (911) is pressed against the valve body (94) and the main valve is closed. When pressure in the main chamber (99) is higher than the sum of the pressure in the back chamber (910) and the elastic force of the spring (911), the valve core (96) is pushed away from the valve body (94) causing the main valve to open and allowing medium to flow from the inlet (97) to the outlet (98). Between the main chamber (99) and the back chamber (910) is an equalizing hole (912). Between the back chamber (910) and the outlet (98) are passages $A_1A_2$, $B_1B_2$ which are opened and closed by the pilot valve (92). When the pilot valve (92) opens, and the area of passages $A_1A_2$ and $B_1B_2$ communicate with the outlet (98), the back chamber (910) depressurizes and the main valve (91) opens. When the pilot valve (92) closes, passages $A_1A_2$ and $B_1B_2$ do not communicate with each other, the back chamber (910) pressurizes through equalizing hole (912) and the main valve (91) closes. In the present invention, an isolation valve core (93) is disposed the passages $A_1A_2$ and $B_1B_2$ between the main valve (91) and the pilot valve (92), the isolation valve core (93) having a cylindrical or conical surface which mates with a corresponding cylindrical or conical opening in the valve cover (95). When the isolation valve core (93) is situated at a position as shown in FIG. 1(c), the two holes $A_3$, $B_3$ formed in the isolation valve core (93) are in communication with passages $A_1A_2$ and $B_1B_2$ respectively, and the pilot valve (92) is under its normal working state. When the pilot valve (92) is out of order or ambient conditions cannot conform to the characteristic parameters of the valve, the isolation valve core (93) can be turned to a position as shown in FIG. 1(d) which will cut off passages $A_1A_2$ and $B_1B_2$ between the main valve (91) and the pilot valve (92). If the isolation valve core (93) is further turned to a position as shown in FIG. 1(e), passages $A_1$ and $B_1$ will be in communication through a radial slot C formed in the surface of the isolation valve core (93). When the isolation valve core (93) is switched between the two positions shown in FIGS. 1(d) and 1(e), passages $A_2$ and $B_2$ are always blocked. In other words, the pilot valve (92) can be opened or dismantled for repair, while the action of the main valve (91) can still be controlled in operation with the isolation valve (93) to effect on-line maintenance.

Figure 1C:
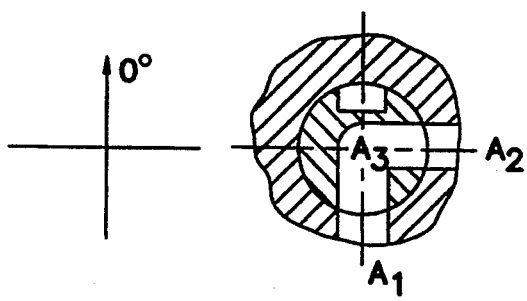
Figure 1C:
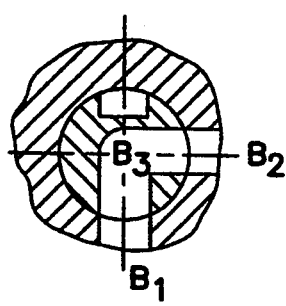
Figure 1D:
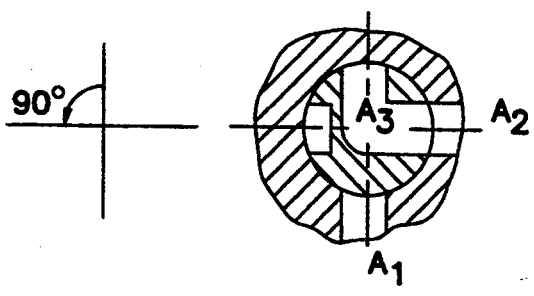
Figure 1E:
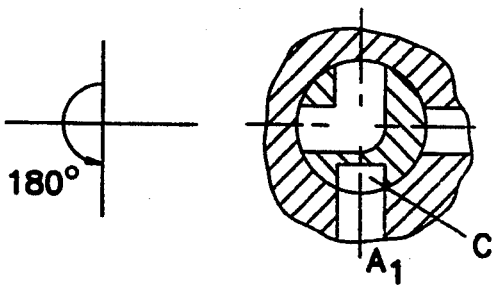

The isolation valve core (93) may be rotated slightly out of alignment with the positions shown in FIG. 1(c) or FIG. 1(e) to regulate the passage sectional area between the back chamber (910) of the main valve (91) and the outlet (98), so as to regulate the opening time of the main valve (91) through throttling.

The second embodiment shown in FIG. 2 is an isolation pilot type magnetic valve in the field of instrument valves. It consists of a main valve (81), a two-position, three-way pilot valve (82) and an isolation valve (83). There are three passages $A_1A_2$, $B_1B_2$ and $C_1C_2$ between the main valve (81) and the pilot valve (82). On the main valve (81) side, passage $A_1$ is in communication with an inlet (86) of the main valve (81). Passage $B_1$ is in communication with a back chamber (87) of the main valve (81), and passage $C_1$ is in communication with an outlet (88). On the pilot valve (82) side, the passage $A_2$ is in communication with an inlet of the pilot valve (82), passage $B_2$ is in communication with an intermediate chamber of the pilot valve (82), and passage $C_2$ is in communication with an outlet of the pilot valve (82). Isolation valve core (85) is a cylinder on which there are three curved slots $A_3$, $B_3$, $C_3$ and two axial slots D and E. In a normal position, the three curved slots $A_3$, $B_3$, and $C_3$ are in communication with passages $A_1A_2$, $B_1B_2$ and $C_1C_2$ respectively, and the magnetic valve works normally. See FIGS. 2(a), 2(b) and 2(g).

Figure 2G:
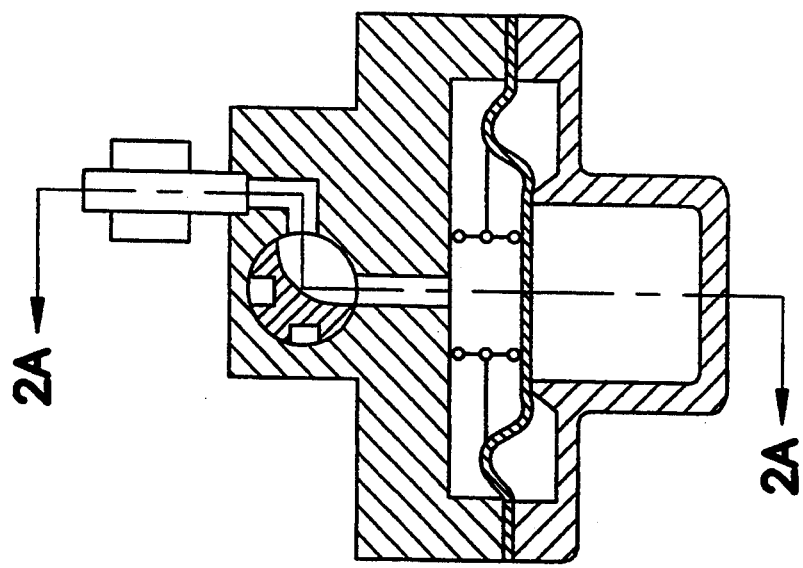
FIGS. 2(a)–2(g) are schematic diagrams of the structure and isolation principles of the second embodiment of the present invention, an isolation pilot type magnetic valve in the field of instrument valves.
Figure 2A:
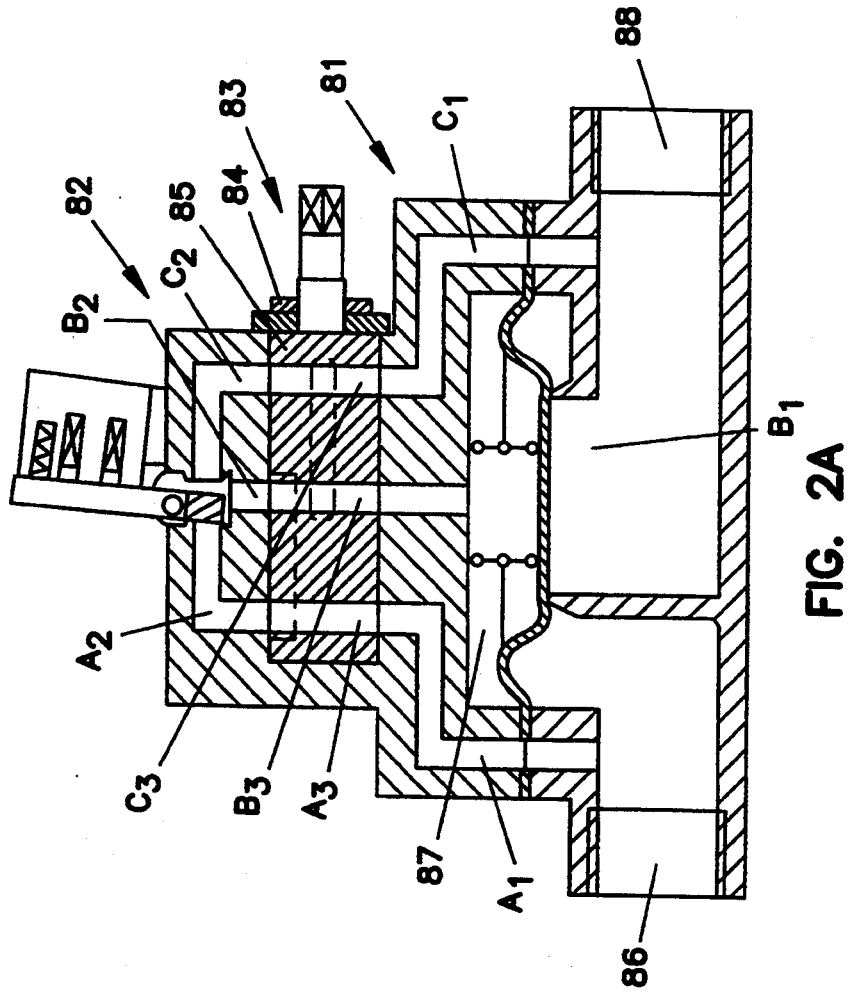
Figure 2B:
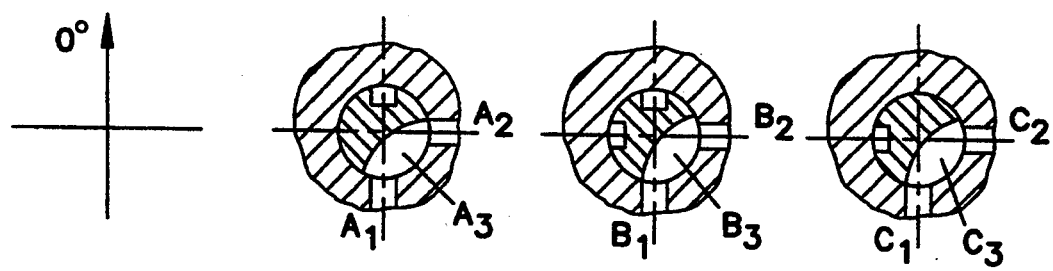
Figure 2C:
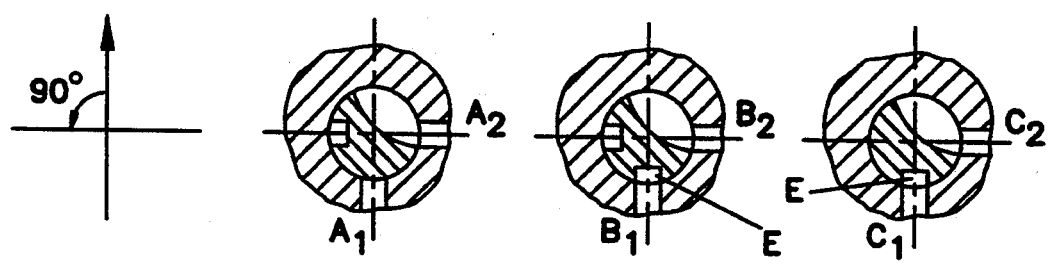
Figure 2D:
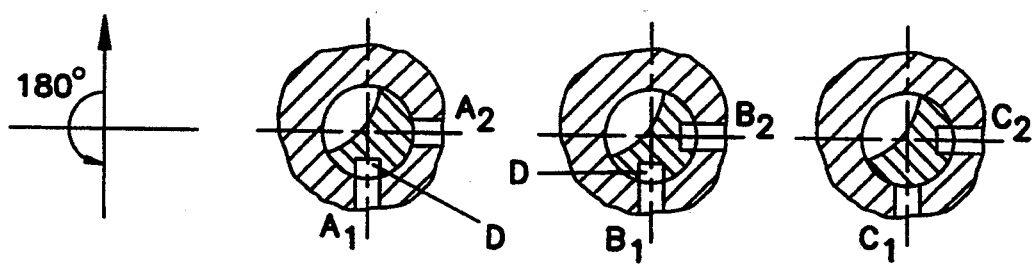

When the pilot valve (82) is out of order, the isolation valve core (85) can be turned to either of the positions shown in FIG. 2(c) or FIG. 2(d) which closes the passages $A_2$, $B_2$, and $C_2$, and as a result pilot valve (82) is isolated and can be dismantled for repair. In FIG. 2(c), the axial slot E on the isolation valve core (85) allows passage $B_1$ to communicate with $C_1$, causing the main valve (81) to open; while in FIG. 2(d), axial slot D on the isolation valve core (85) allows passage $A_1$ to communicate with $B_1$, causing the main valve (81) to close. The isolation valve core (85) can be turned by hand to control the action of the main valve (81) after the pilot valve (82) has been dismantled.

As may be seen in FIG. 2(b), the three curved slots $A_3$, $B_3$, and $C_1$ on the isolation valve core (85) are not entirely identical, of which slot $B_3$ is the widest, slot $A_3$ is shorter at its right side, and $C_3$ is shorter at its left side. When the isolation valve core (85) is in a normal position, the three slots $A_3$, $B_3$, and $C_3$ do not block the passages $A_1A_2$, $B_1B_2$ and $C_1C_2$, while a slight turning of the isolation valve core clockwise (85) relative to the normal position shown in FIG. 2(b) will partially block passage $A_2$, but passage $C_1C_2$ will not be blocked, or by slightly rotating the isolation valve core (85) counterclockwise, passage $A_1A_2$ may not be blocked but passage $C_1$ will be partially blocked. Thus, throttling action is provided and the time to open or close the magnetic valve can be regulated. Similarly, during manual operation of the isolation valve (83), axial slots D and E can partially block the flowing passage so as to control actuating time. In order to obtain a relatively stable time parameter, a lock nut (84) can be added outside the isolation valve core (85).

Figure 2E:
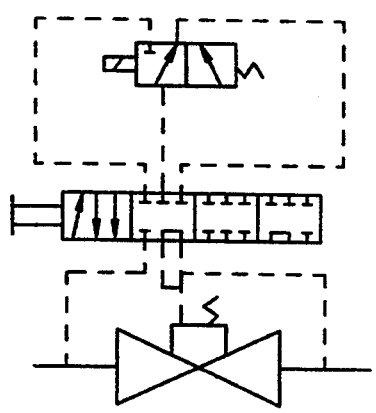
Figure 2F:
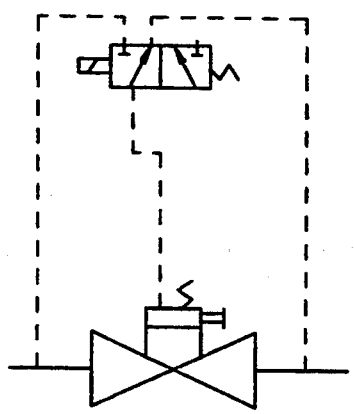

FIG. 2(e) is a schematic diagram of the second embodiment of the present invention described above to show its working principle. FIG. 2(f) is another schematic diagram of the second embodiment employing simplified symbols.

The pilot type magnetic valve of this embodiment may adopt a holding type valve or adopt two pilot valves which will accomplish a switching action upon energization. And, the pilot valve of the present invention is not limited to being a magnetic valve, but may also be a constant pressure pilot valve or a constant temperature pilot valve. The mode of control of the valve of the present invention is not limited to internal control, but may also utilize external control, i.e. utilizing external pressure, temperature or signals to control action of the main valve.

The third embodiment shown in FIG. 3 is an isolation pilot type magnetic overflow valve in the hydropneumatic field. It consists of a main valve (11), a manual pressure adjusting valve (12), a damping throttle valve (13) and a magnetic pilot valve (14). Between the main valve (11) and the magnetic pilot valve (14), are two passages $P_1P_2$, $O_1O_2$. Passage $P_1$ is in communication with a piston upper chamber $P_4$ of the main valve (11), passage $O_1$ is in communication with an oil drain chamber $O_4$, passage $P_2$ is in communication with an inlet of the magnetic pilot valve (14), and passage $O_2$ is in connection with an outlet of magnetic pilot valve (14). After energizing the magnetic pilot valve (14), a hole $P_3$ and a slot $O_3$ on a valve seat (16) of the manual pressure adjusting valve (12) are situated to communicate with passages $P_1P_2$, $O_1O_2$, respectively. Oil in an upper chamber $P_4$ of the main valve (11) flows to an oil drain chamber $O_4$ through the magnetic pilot valve (14), and the main valve (11) then begins to drain. When current is cut off to the magnetic pilot valve (14), the above-mentioned passages $P_1P_2$, $O_1O_2$ are blocked and the main valve (11) is blocked, as well. The manual pressure adjusting valve (12) limits the maximum pressure of hydraulic oil within the system. When hydraulic oil pressure exceeds the set value, oil in the upper chamber $P_4$ of the main valve (11) will push open a conical lifting valve core (17) of the manual pressure adjusting valve (12) to allow oil to flow into the oil drain chamber $O_4$, and then the main valve (11) drains as well. Since the magnetic overflow valve may be considered a magnetic automatic control valve, the manual pressure adjusting valve (12) is regarded as a part of the main valve (11). The effect of the damping throttle valve (13) lies in lengthening the unloading time and diminishing noise. The structural principle of this valve is well known to technicians in this field and a detailed description is unnecessary. This embodiment differs from the conventional valve merely in the valve seat (16) of the manual pressure adjusting valve (12), which not only precisely fits in the valve body (18) but is also rotatable so as to act as an isolation valve core concurrently. When the valve seat is in its normal position, the holes and slots thereon are in communication with passages $P_1P_2$ and $O_1O_2$, as shown in FIG. 3(a), and the isolation magnetic overflow valve works normally. When either the magnetic pilot valve (14) or the damping throttle valve (13) is out of order, the valve seat (16) can be rotated to block passage $P_2$ and $O_2$, as shown in FIG. 3(d). Then the magnetic pilot valve (14) or the damping throttle valve (13) can be opened or dismantled for repair, while the main valve (11) can still pilot-control overflow by the manual pressure adjusting valve (12). One end of the valve seat (16) which is stopped up by a plug (15) acts as an external control port which can be used to control overflow externally.

Figure 3A:
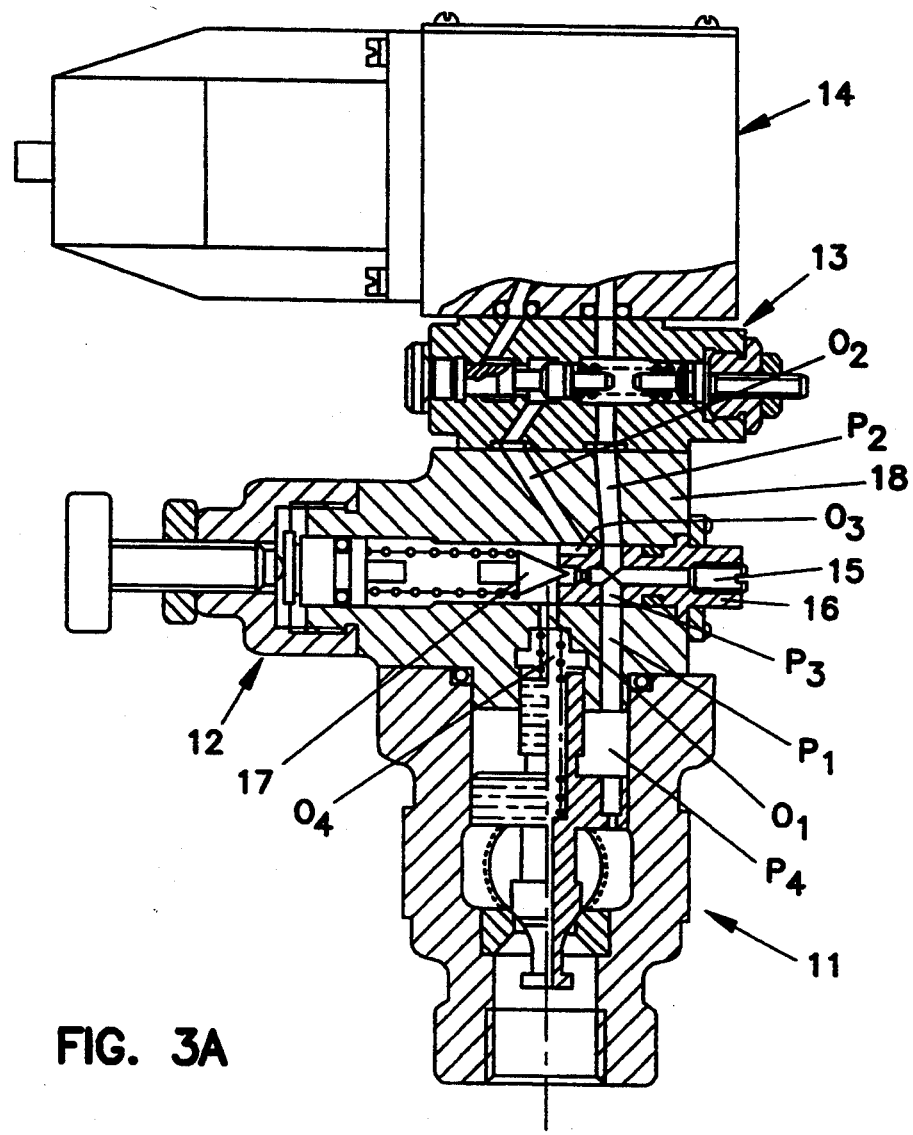
FIGS. 3(a)–3(d) are schematic diagrams of the structure and isolation principles of the third embodiment of the present invention, an isolation pilot type magnetic overflow valve with the valve seat of a built-in manual pressure adjusting valve modified into a rotatable isolation valve.
Figure 3B:
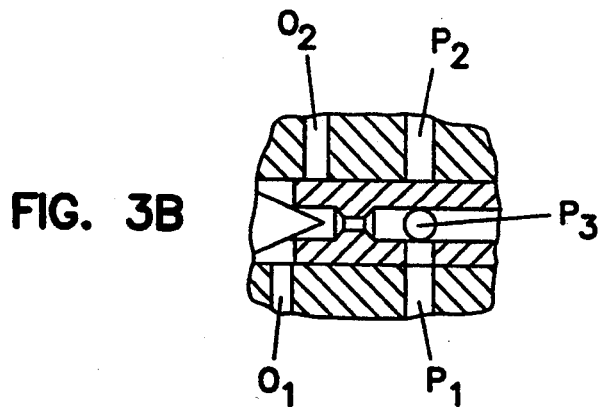
Figure 3D:
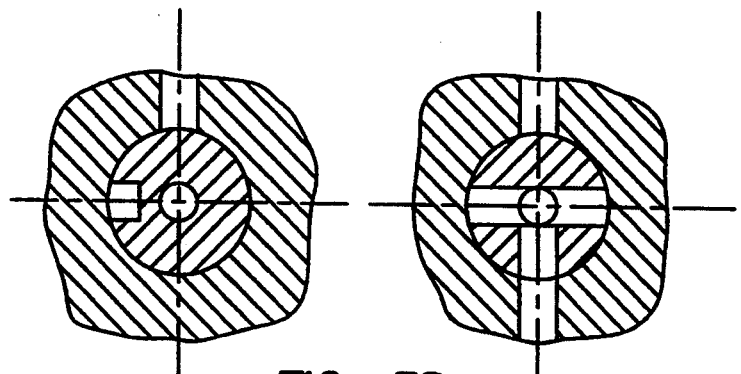
Figure 3C:
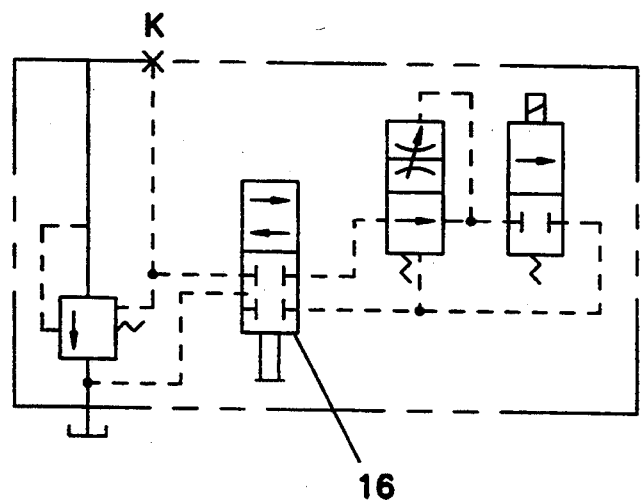

FIG. 3(c) is a simplified graphic symbol diagram of the third embodiment of the invention, wherein reference number (16) is an isolation valve.

The isolation pilot magnetic overflow valve of this embodiment does not need any additional parts but only a slight modification of the valve seat (16) of the manual pressure adjusting valve (12) so as to effect the function of the isolation pilot valve (14) and to achieve on-line maintenance of the magnetic pilot valve and damping throttle valve with distinct advantage.

Figure 4A:
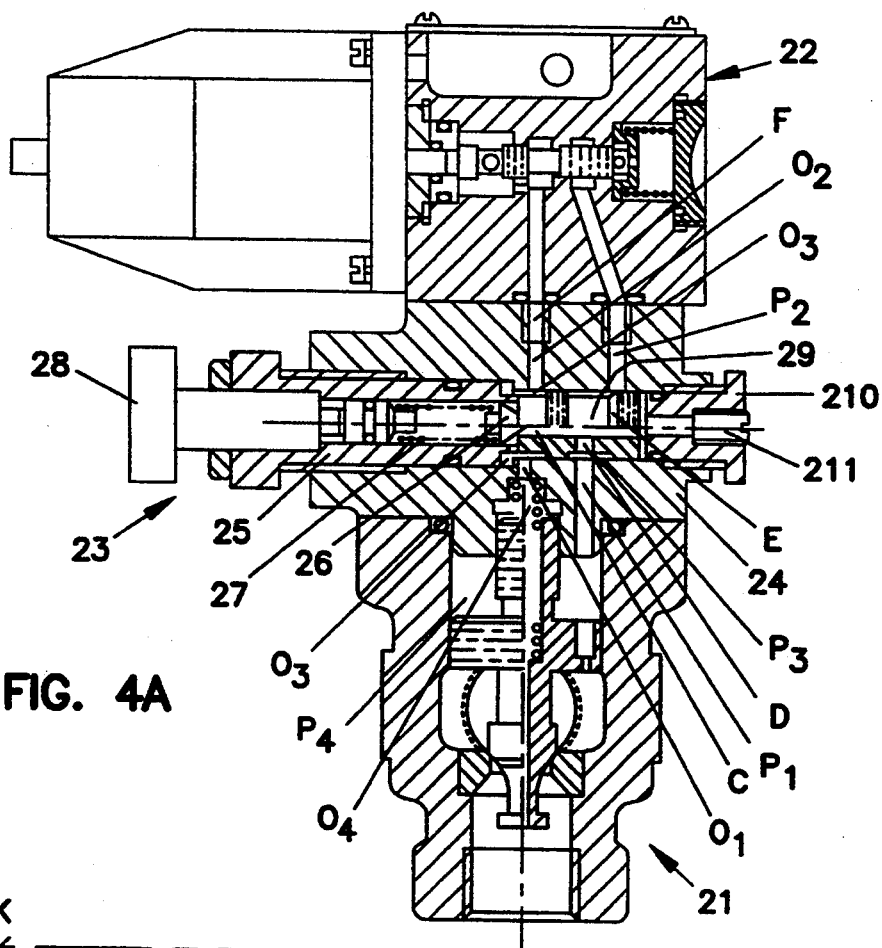
FIGS. 4(a)–4(c) are schematic diagrams of the structure and isolation principles of the fourth embodiment of the present invention, an isolation pilot type magnetic overflow valve which puts forward further a simplified new structure of a combination of a manual pressure adjusting valve with damping throttle valve.

The fourth embodiment shown in FIG. 4 is an isolation magnetic overflow valve with improvements made on the third embodiment. The valve seat of its manual pressure adjusting valve functions as a sliding throttle valve core to eliminate the whole damping throttle valve, and its structure is shown in FIG. 4(a). The magnetic overflow valve shown in this embodiment consists of a main valve (21), a magnetic pilot valve (22) and an isolation pressure adjusting valve (23) joined to the main valve (21). The structures of the main valve (21) and the magnetic pilot valve (22) are conventional, and communicate through two passages $P_1P_2$ and $O_1O_2$ disposed therebetween. Passage $P_1$ is in communication with a piston upper chamber $P_4$ of the main valve (21), and passage $O_1$ is in communication with an oil drain chamber or an oil drain outlet $O_4$ of the main valve (21). Passages $P_2,O_2$ are in communication with the inlet and outlet of the magnetic pilot valve (22). The isolation pressure adjusting throttle valve (23) consists mainly of a valve body (24), a valve cover (25), a pressure adjusting conical lifting valve core (26), a compression spring (27), a pressure adjusting rod (28), a throttle valve core (29) slidable into the valve body (24), a limit screw tube (210) and a plug (211). An annular slot $P_3$ is defined on the middle of the outer circumference of the throttle valve core (29). The throttle valve core (29) is also smaller in periphery at its end nearest the valve cover (25) to form an annular chamber $O_3$. Annular slot $P_3$ and annular chamber $O_3$ are in communication with passages $P_1P_2$ and $O_1O_2$ when the throttle valve core (29) is in its normal position, and the main valve (21) overflows under control of the magnetic pilot valve (22). The throttle valve core (29) is hollow, having an axial hole C and a radial hole D which communicates with the annular slot P. The conical valve core (26) is biased toward an open end of the axial hole C of the throttle valve core (29) under the action of the compression spring (27). The maximum pressure of the isolation magnetic overflow valve is adjusted by the pressure adjusting rod (28). A tapered shoulder E is formed at one end of the annular slot $P_3$ of the throttle valve core (29) to form a throttle port with the passage $P_2$ on the valve body (24). In operation, high pressure oil enters into the right end of the throttle valve core (29) from passage $P_1$, through annular slot $P_3$ and holes D and C, thereby pushing the throttle valve core (29) leftward into contact with the end face of the valve cover (25) protruding into the valve body (24). The magnetic pilot valve (22) is opened to guide the main valve (21) to overflow. The hydraulic pressure at the end of passage P is lowered gradually to the pressure in the oil drain chamber $O_4$ of the passage $O_1$ due to the action of the throttle port to effect a damping function. The speed of unloading is determined by adjusting the position of the valve cover (25). As the throttle valve core (29) moves, the conical valve core (26) remains in contact with the throttle valve core (29) due to the action of the compression spring (27). When the valve cover (25) is adjusted, the compression spring remains (27) unchanged in its position relative to the valve cover (25); hence, it only adjusts the damping unloading time. In order to change the maximum overflow pressure, the adjusting rod (28) is turned.

Figure 4C:
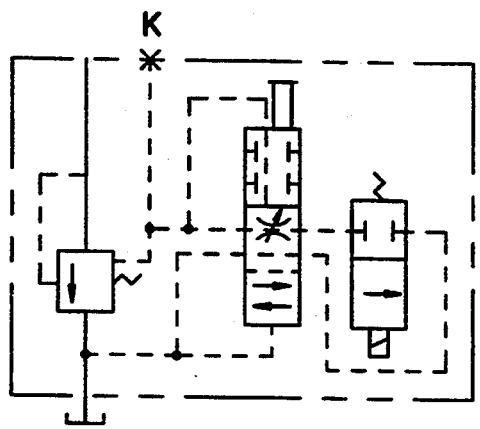
Figure 4B:
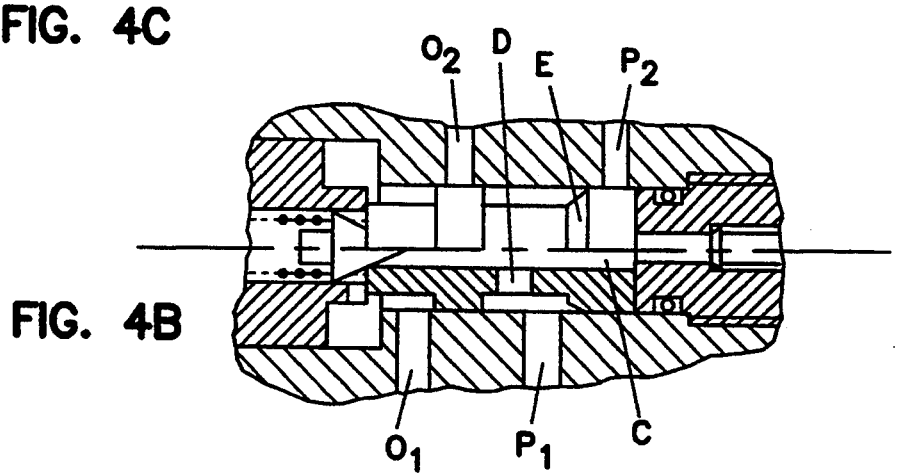

When the magnetic pilot valve (22) is out of order, the valve cover (25) can be retracted, and the limit screw tube (210) can be turned to push the throttle valve core (29) leftward until shoulders of the throttle valve core (29) block passages $P_2$ and $O_2$, as shown in FIG. 4(b). As a result, the magnetic pilot valve (22) is isolated and maintenance can be carried out. The main valve (21) may now overflow under the piloting control of the conical valve core (26). The plug (211) is mounted at an end of the limit screw tube (210) and provides an external control port which can be used to control overflow externally.

FIG. 4(c) is a simplified graphic symbol diagram of the fourth embodiment of the invention.

It is thus evident from the above description that this embodiment puts forward a simple new structure for an isolation magnetic overflow valve with a damping throttle valve and a manual pressure adjusting valve, wherein the valve seat of the manual pressure adjusting valve acts as a throttle valve core whereby the whole throttle valve is eliminated so as to realise a compact structure, low cost, and to provide a solution to the problem of isolating magnetic pilot waves.

The isolation pressure adjusting throttle valve can also be utilized in a proportion oveflow valve and other automatic control valves.

It is also evident from FIG. 4(a) that screw threads F can be defined in the passages $P_2,O_2$ joining the isolation throttle pressure adjusting valve (23) and the magnetic pilot valve (22) for mounting stand-by screws to prevent oil from leaking after dismantling the magnetic pilot valve (22).

The fifth embodiment shown in FIG. 5 is also an isolation magnetic overflow valve. It is a further development on the basis of the third embodiment in which the manual pressure adjusting valve seat has been modified to be rotatable and is also to be used as an isolation valve core. The valve consists of a main valve (31) (main valve with manual pressure adjusting valve), a pilot valve (32) and an isolation valve (33). It differs from the two foregoing embodiments in that the pilot valve (32) is a two-position, four-way magnetic switching valve, and there are further two remote pressure adjusting valves A and B (See FIGS. 5(k) and 5(l)). When pilot valve (32) or the remote pressure adjusting valves A and B are damaged, separately or entirely, it is still possible to control the overflow of the main valve (31) automatically or manually during repair.

Figure 5A:
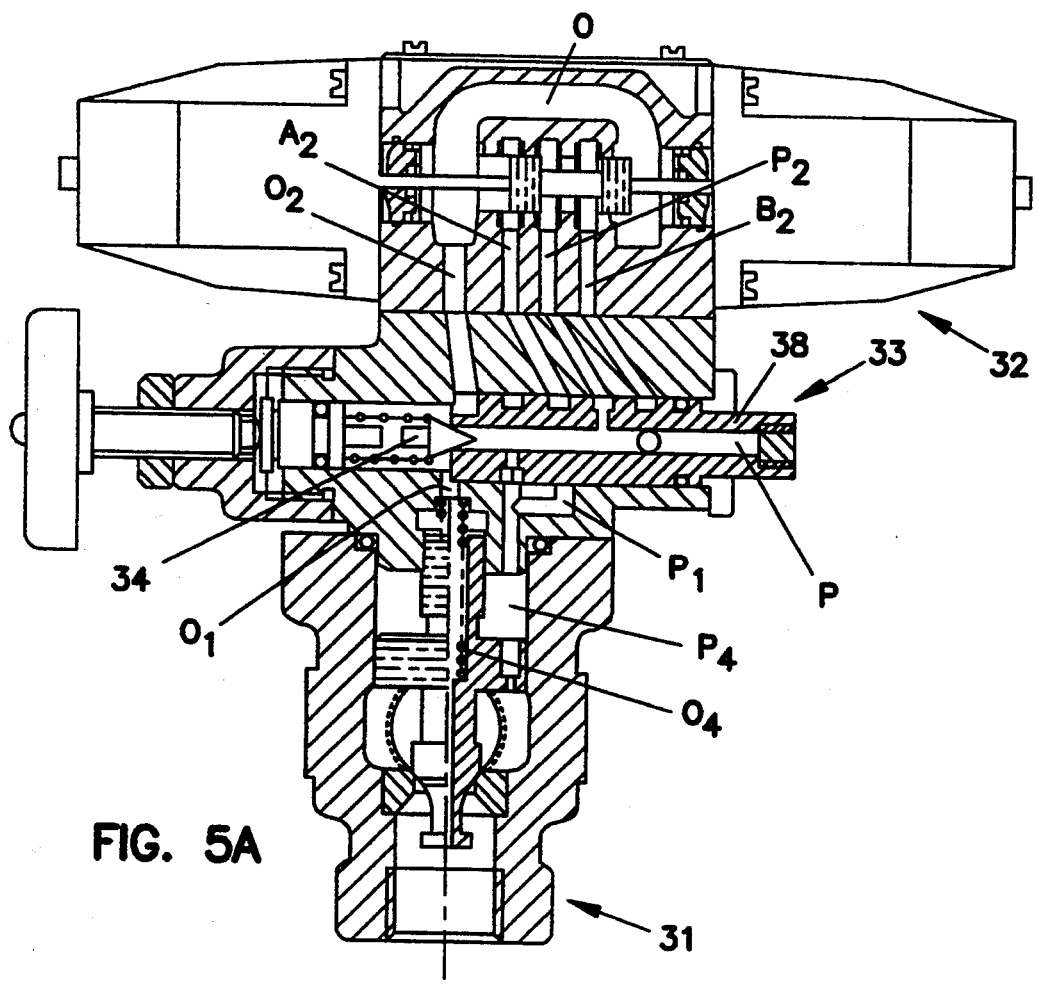
FIGS. 5(a)–5(n) are schematic diagrams of the structure and isolation principles of the fifth embodiment of the present invention, an isolation pilot type magnetic overflow valve which can still be manually or automatically controlled under the condition that a magnetic switching valve and two remote pressure adjusting valves are out of order.

As shown in FIG. 5(a), there are four passages $P_1P_2$, $A_1A_2$, $B_1B_2$, and $O_1O_2$ between the main valve (31) and the pilot valve (32). Passages $P_1$ and $O_1$ are in communication with a piston upper chamber $P_4$ and an oil drain chamber $O_4$, respectively, and passages $A_1$, $B_1$ are in communication with two remote pressure adjusting valves A and B. Passages $P_2$, $A_2$, $B_2$ and $O_2$ are in communication with corresponding chambers of the magnetic switching valve (32). A hole P is formed along the central axis of an isolation valve core (38), and a manual pressure adjusting conical lifting valve core (34) is biased tightly by a spring against an open end of hole P of the isolation valve core (38). Referring to FIGS. 5(b)–5(g), three curved slots $P_3$, $A_3$, and $B_3$ and a notch $O_3$ are defined in the outer surface of the isolation valve core (38). When the isolation valve core (38) is in its normal position, as shown in FIGS. 5(b) and 5(c), slots $A_1$ and $B_1$ and notch $O_3$ are connected to passages $A_1A_2$, $B_1B_1$, and $O_1O_2$, respectively, passages $P_1$ and $P_2$ are, through central hole P, in communication with two radial holes P' and P''. In this configuration, the isolation magnetic overflow valve works normally.

Figure 5M:
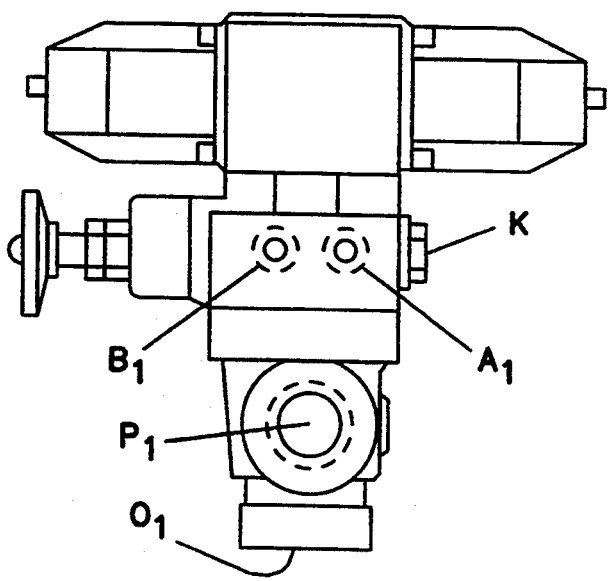
Figure 5N:
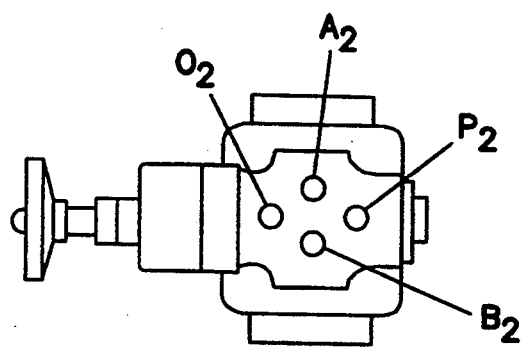
Figure 5B:
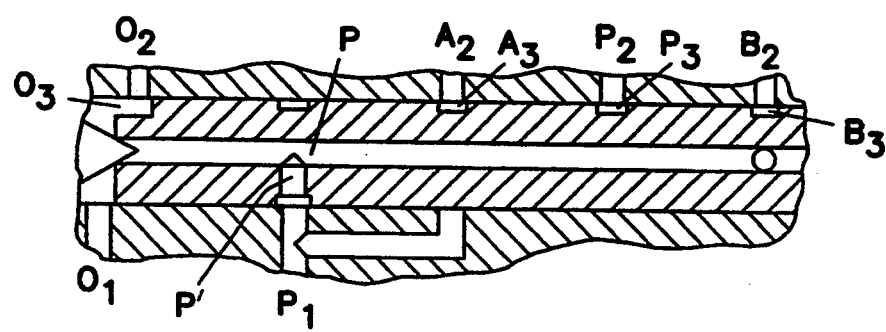
Figure 5C:
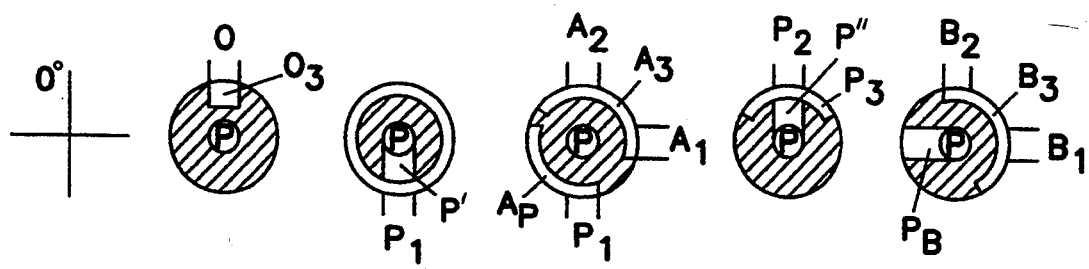

FIG. 5(m) is a side view of the fifth embodiment showing the external location of the passages $A_1$, $B_1$, $P_1$ and $O_1$. FIG. 5(n) is a top plan view of the fifth embodiment after having the pilot valve (32) dismantled. FIGS. 5(k) and 5(l) are, respectively, schematic diagrams of the fifth embodiment of the present invention using hydraulic graphic symbols and simplified symbols.

Figure 5D:
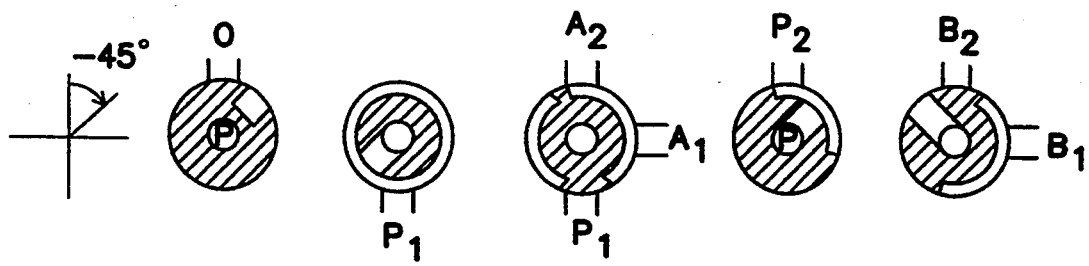
Figure 5E:
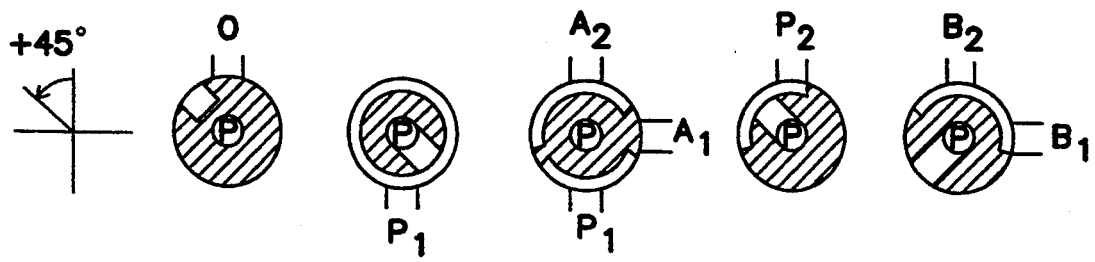
Figure 5F:
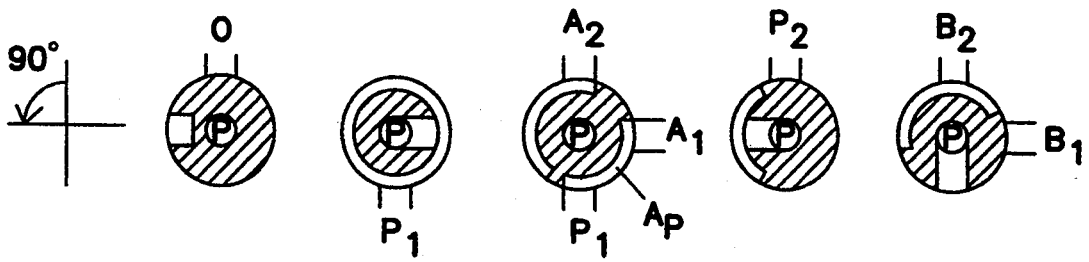

When remote pressure adjusting valve B is out of order, the isolation valve (33) can be turned to the position as shown in FIG. 5(d), where passage $B_2$ is isolated and repair work can be carried out for the remote pressure adjusting valve B. The main valve (31) works under a piloting control of the pressure adjusting valve A and the manual adjusting valve. The pressure of the manual adjusting valve can be set at the original value of the pressure adjusting valve B. Similarly, when the pressure adjusting valve A is out of order, the isolation valve can be turned to the position as shown in FIG. 5(e) where pressure adjusting valve A is isolated.

Figure 5G:
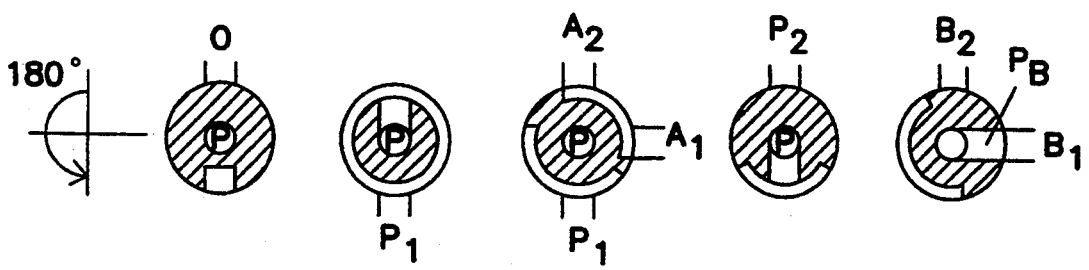
Figure 5K:
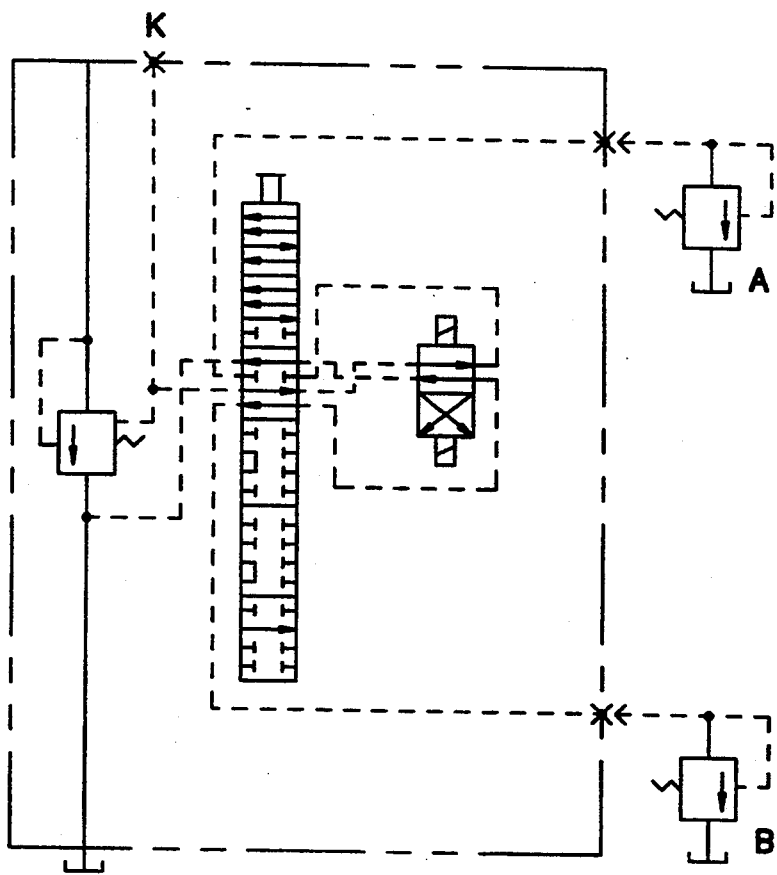
Figure 5L:
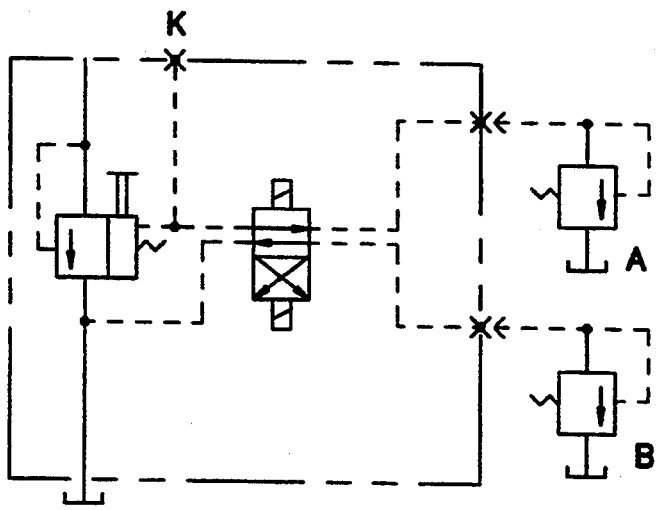

And when the magnetic switching valve (32) is out of order, the isolation valve core (38) can be turned by hand to effect overflow under the control of the pressure adjusting valves A and B. At the position shown in FIG. 5(f), the arc shaped slot $A_p$ allow passages $P_1A_1$ to communicate, and pressure adjusting valve A will function. At the position as shown in FIG. 5(g), a radial hole $P_B$ links passages $P_1$ and $B_1$ through hole P, and the pressure adjusting valve B will function. Under these two conditions, passages $P_2$, $A_2$, $B_2$ and $O_2$ are all isolated from passage $P_1$; therefore, the magnetic switching valve (32) can be repaired on-line.

It may be appreciated from the embodiment illustrated above that it is fully possible to design an isolation valve core to suit a three-position, four-way magnetic switching valve, and, with a slight modification of the holes and slots thereon, to achieve a function similar to O type and H type sliding valves with the aim that the main valve (31) will unload and load in the median of manual control.

Figure 6A:
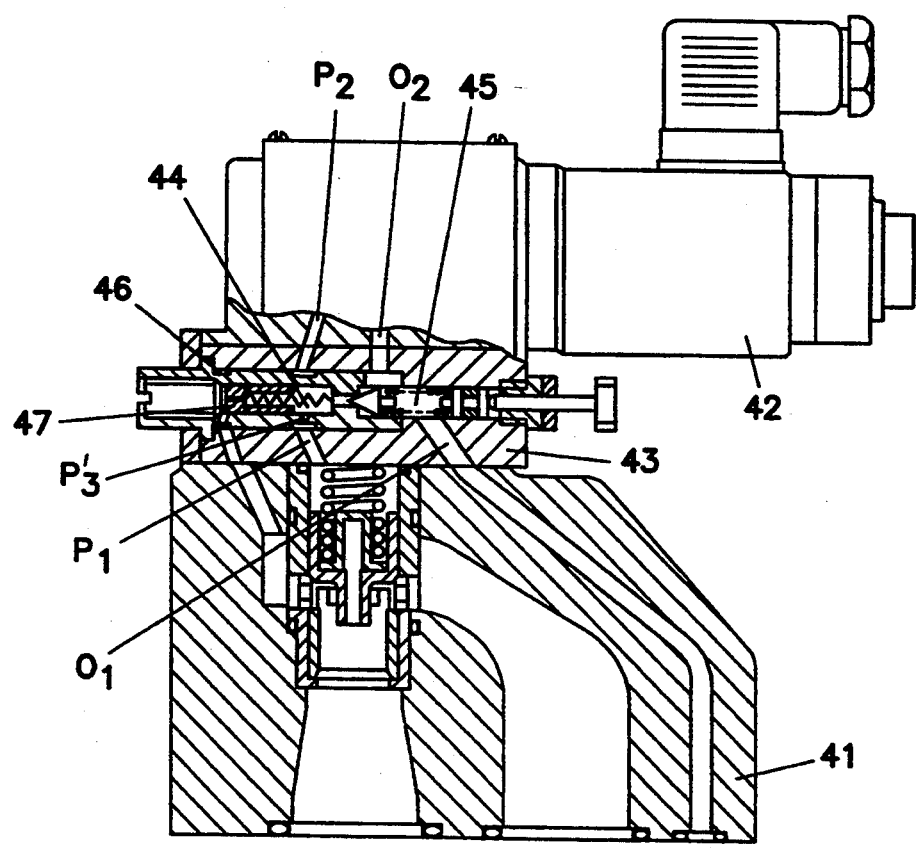

The sixth embodiment shown in FIG. 6 is a proportion depressurization valve having an isolation function and includes a pressure compensating throttle valve and a manual pressure adjusting valve. The valve consists of a main valve (41), a proportion pilot valve (42) and an isolation throttle pressure adjusting valve (43) composed of a pressure compensating isolation throttle valve (44) and a manual pressure adjusting valve (45). The valve of this embodiment differs from conventional proportion depressurization valves in that a valve sleeve (46) of the throttle valve (44) is rotatable, lengthened, and includes some holes or slots distributed thereupon. As shown in FIGS. 6(a) and 6(d), when the valve sleeve (46) is in its normal position, holes P, P'$_3$, $O_3$ and O'$_3$, and slot $P_3$ on valve sleeve (46) enable the main valve (41) to communicate with passages $P_1P_2$ and $O_1O_2$ of the proportion pilot valve (42). This configuration allows the proportion depressurization valve to work normally. An increase of pressure at an inlet end will push a core (47) in the valve sleeve (46) of the throttle valve (44) rightward, and its end face and hole P'$_3$ on the valve sleeve (46) form a throttle port which will effect the function of automatic compensation. When the proportion pilot valve (42) is out of order, the valve sleeve (46) can be turned to the position as shown in FIG. 6(b), where holes $P_2$ and $O_2$ are blocked, resulting in the proportion pilot valve (42) being isolated. Hydraulic oil at an inlet side of the main valve (41) can still enter into a back chamber of the main valve (41) through the throttle valve (44) and depressurizes automatically under control of the manual pressure adjusting valve (45). In other words, when the proportion pilot valve (42) is out of order, manual adjusting of the pressure adjusting valve (45) will enable the main valve (41) to output at a set value pressure and to retain the function of automatic compensation for inlet pressure fluctuation.

This kind of isolation throttle valve (44) with valve sleeve (46) can be utilized in other automatic control valves.

FIGS. 6(d) and 6(e) are partial sectional views of holes of an isolation throttle valve according to the sixth embodiment of the present invention.

FIG. 6(c) is a simplified graphic symbol diagram of the sixth embodiment of the invention.

The seventh embodiment shown in FIG. 7 is an isolation unloading valve in hydropneumatic field. FIG. 7(a) is a simplified structure diagram of this embodiment. The valve consists of a common unloading overflow valve (51) and an isolation valve (52). The unloading overflow valve (51) in turn consists of a main valve (53), a pilot valve (54) and a check valve (55). The isolation valve (52) includes an isolation valve core (57) having three radial holes $P_3$, $O_3$, and $A_3$ formed therein and in fluid communication with inlet passages $P_1P_2$, oil drain passages $O_1O_2$ and working passages $A_1A_2$, respectively. Passages $P_1$, $O_1$ and $A_1$ are, respectively, an oil inlet port, an oil overflow port and a working port. An axial hole P and a check valve seat are formed in the isolation valve core (57). The check valve (55) slides in the check valve seat. When its main valve (53) or pilot valve (54) is out of order, the isolation valve core (57) may be turned 90#, as shown in FIG. 7(b), which results in the passages $P_2$, $O_2$ and $A_2$ being blocked and the main valve (53) being isolated. Oil in oil inlet $P_1$, is allowed to however, flow to working port $A_1$ through radial hole $P_3$ (at 90# with $P'_3$) and axial hole P, and through the check valve (55). A spiral slot S on the isolation valve core (57) cooperates with a limit element (56) on the valve body (58) to force the isolation valve core (57) to move axially during turning. After the isolation valve core (57) is turned 90#, as shown in FIG. 7(c), the passages $P_2$, $A_2$ and $O_2$ are still blocked while oil inlet $P_1$ and oil drain $O_1$ are unloading through an axial slot B formed in the isolation valve core (57).

This embodiment differs from other embodiments disclosed herein in that the isolation valve (52) does not isolate the pilot valve (54), but isolates only the main valve (53). The isolation valve core (57) not only rotates on its axis but also moves as it is switched from normal to isolation mode.

Figure 7A:
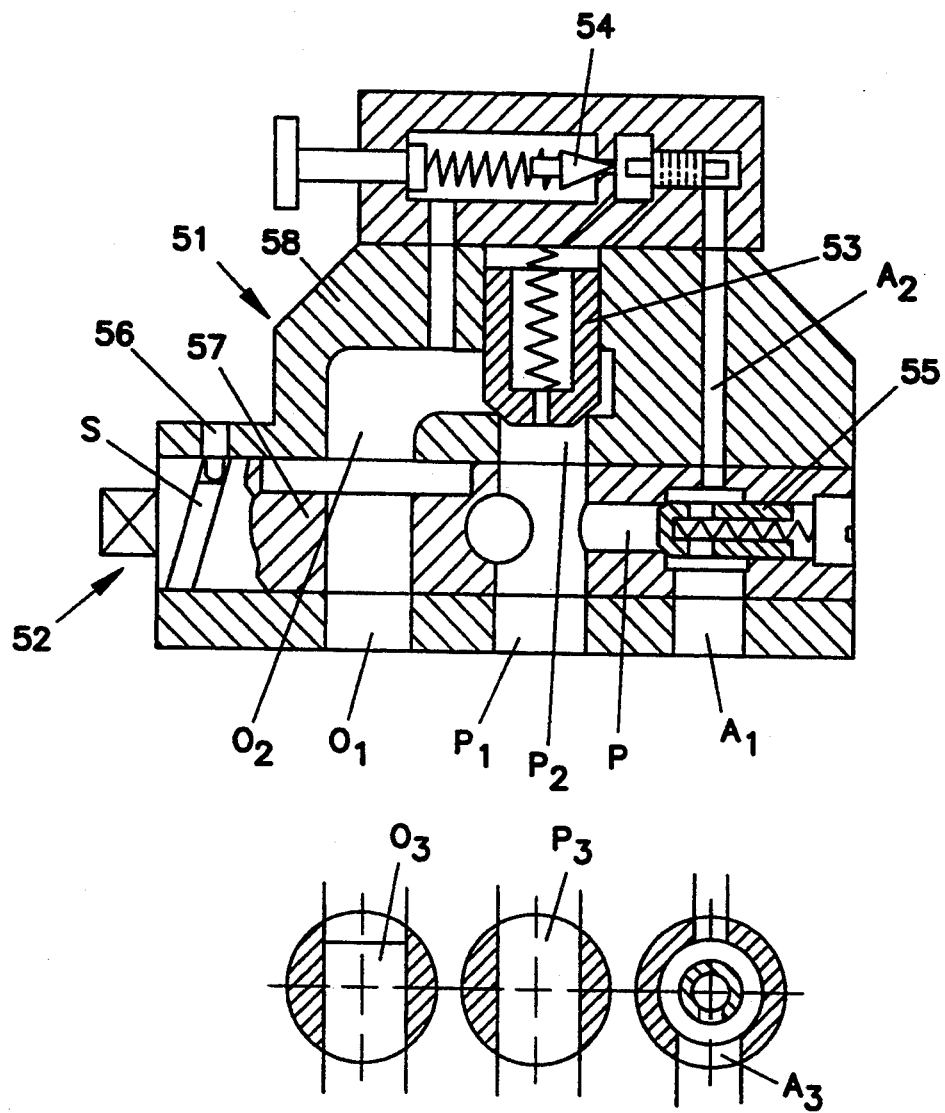
FIGS. 7(a)–7(e) are schematic diagrams of the structure and isolation principles of the seventh embodiment of the present invention, an isolation unloading overflow valve which does not isolate the pilot valve, but isolates the main valve, and whose isolation valve core acts concurrently as a check valve seat.
Figure 7B:
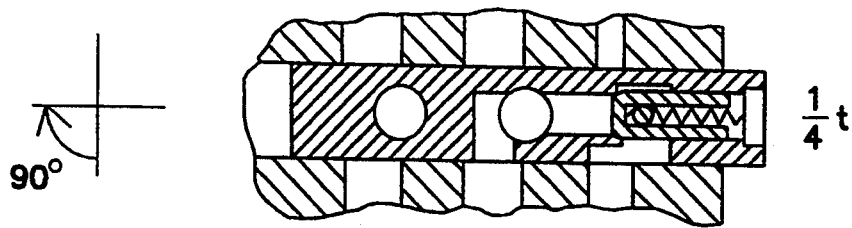
Figure 7C:
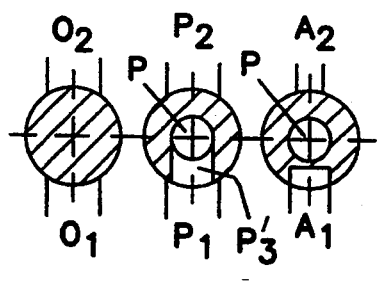
Figure 7C:
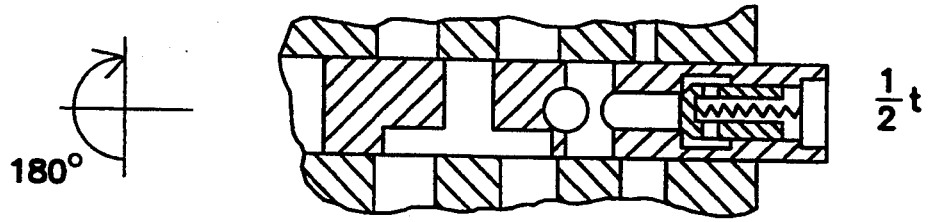
Figure 7D:
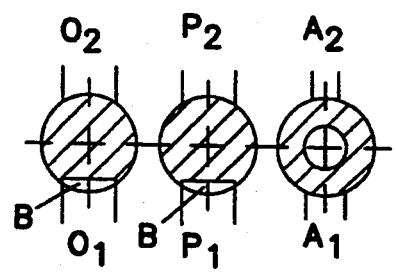
Figure 7D:
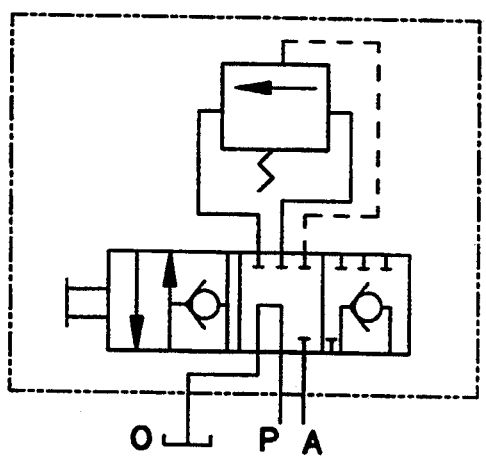
Figure 7E:
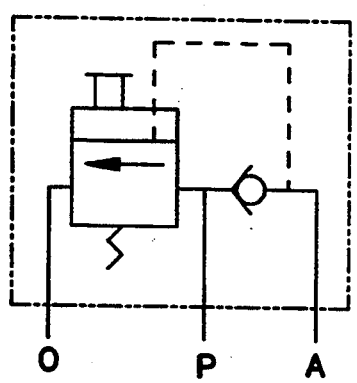

FIG. 7(d) is a schematic diagram of the seventh embodiment, and FIG. 7(e) is a schematic diagram of the seventh embodiment using simplified symbols.

The eighth embodiment shown in FIG. 8 is an electrohydraulic switching valve. It consists of a main valve (61), a three-position, five-way hydraulic switching valve, a pilot valve (62) and an isolation valve (63). Generally, this is a conventional electrohydraulic switching valve in which an isolation valve of simple structure is added. The isolation valve core (64) is a cylinder, precisely located in a valve body (65), in which there are five holes $P_3$, $A_3$, $B_3$, $O_3$ and $O'_3$, with their normal positions shown in FIG. 8(a). In its normal position, the five holes $P_3$, $A_3$, $B_3$, $O_3$, and $O'_3$ of the isolation valve core (64) communicate with five passages $P_1P_2$, $A_1A_2$, $B_1B_1$, $O_1O_2$, $O'_1O'_2$, respectively, allowing fluid flow between the main valve (61) and the pilot valve (62). FIG. 8(b) is a partial enlargement view of the isolation valve. When the pilot valve (62) is out of order, the isolation valve core (64) may be turned 90# as shown in FIG. 8(c) to close the above-mentioned five passages $P_1P_2$, $A_1A_2$, $B_1B_2$, $O_1O_2$, $O'_1O'_2$. Axial slots C and D formed in the isolation valve core (64) allow fluid communication between passages $P_1$ and $A_1$, and between passages $B_1$ and $O'_1$, driving the main valve (61) to one side. If the isolation valve core (64) is turned 270# relative to the normal position, as shown in FIG. 8(e), then axial slots E and F formed in the isolation valve core (64) opposite slots C and C allow fluid communication between passages $P_1$ and $B_1$, and between passages $A_1$ and $O_1$, driving the main valve to another side. In other words, when the pilot valve (62) is out of order, manual operation of the isolation valve (63) provides switching action while isolating the pilot valve for maintenance.

Figure 8A:
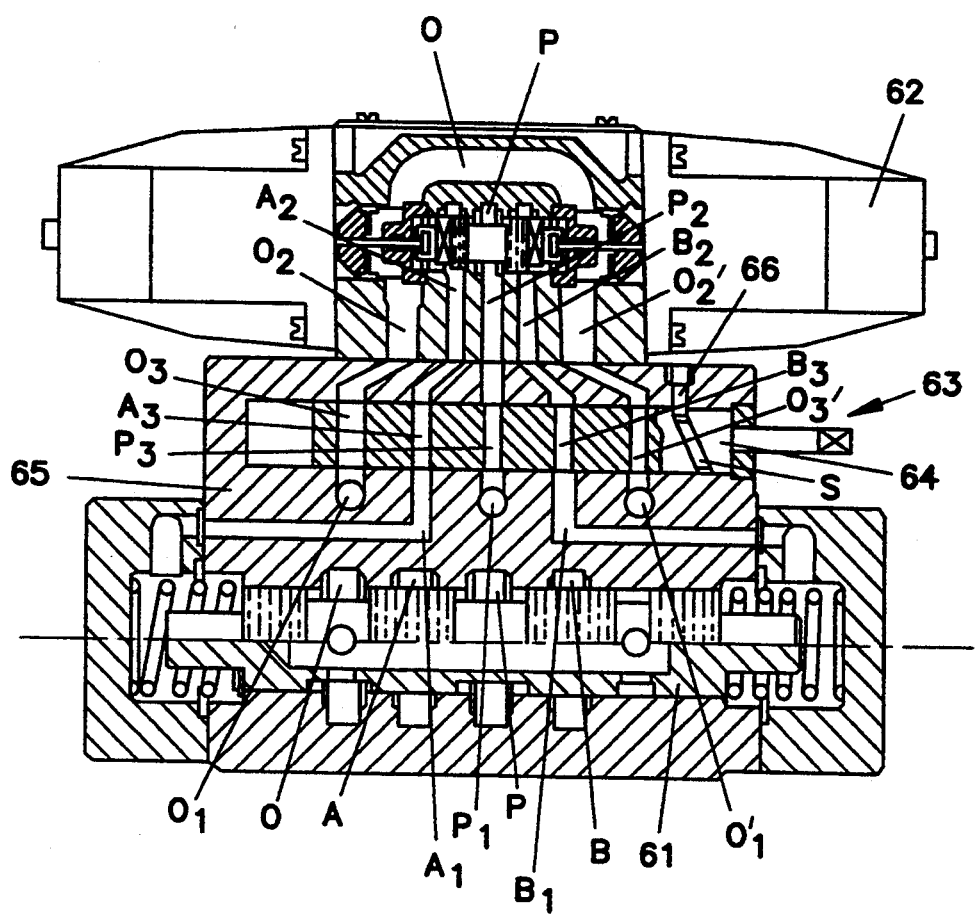
FIGS. 8(a)–8(g) are schematic diagrams of the structure and isolation principles of the eighth embodiment of the present invention, an isolation electrohydraulic switching valve (change valve). The above six embodiments are all automatic control valves in the hydropneumatic field while the seventh and eighth embodiments further put forward a new concept of combined moving-turning type multi-directional switching valve.
Figure 8B:
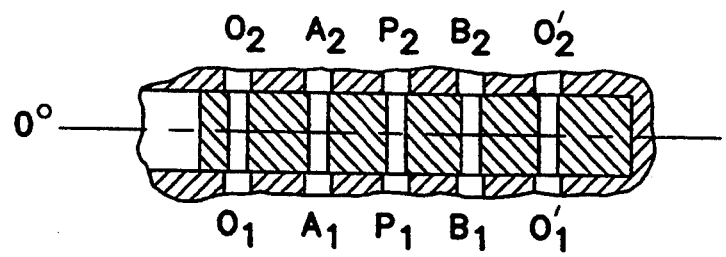
Figure 8C:
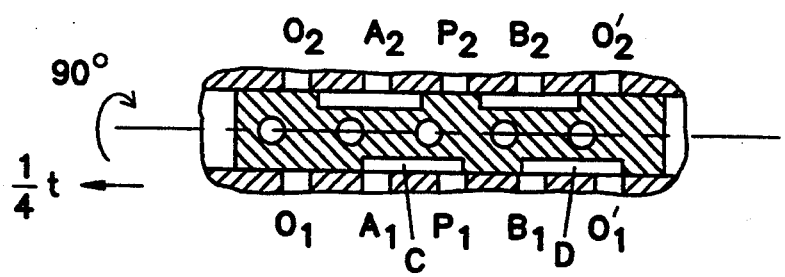
Figure 8D:
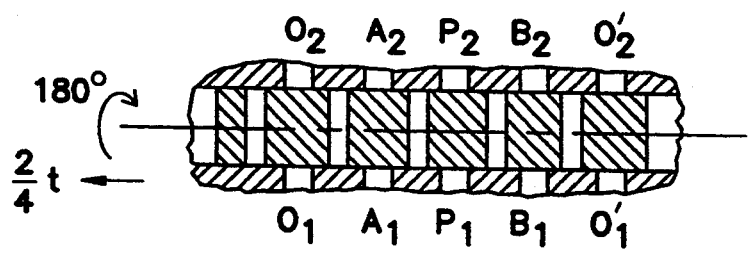
Figure 8E:
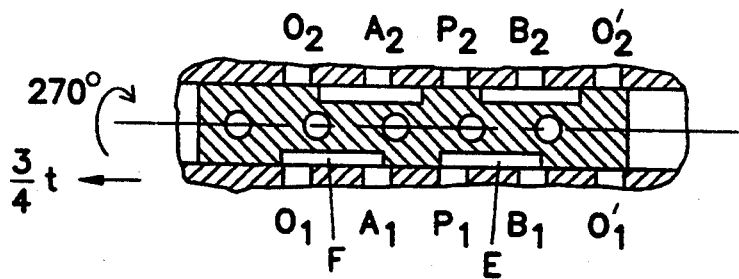

In this embodiment, a piloting spiral slot S is defined on the isolation valve core (64) which cooperates with a limit element (66) on the valve body (65) to force the isolation valve core (64) to move in an axial direction while turning. As shown in FIG. 8(d) (core rotated 180#), holes $P_3$, $A_3$, $B_3$, $O_3$, $O'_3$ on the isolation valve core (64) are displaced longitudinally with respect to the passages in the valve body (65) so that hydraulic oil will not overflow. As a result, the controlling oil at both sides of the main valve (61) stops to flow, and the main valve (61) also stops moving. Of course, T-shaped and L-shaped slots can be used in place of the spiral slot (not shown in the figures), but manual operation will require pushing, pulling and turning of the valve core.

The isolation valve (63) can also function as a throttle during normal working operation, where a slight deviation of the isolation valve core (64) relative to its normal position will cause holes $P_3$–$O'_3$ on the isolation valve core (64) to be displaced with respect to the corresponding passages on the valve body (65) and effect a throttling function.

Figure 8F:
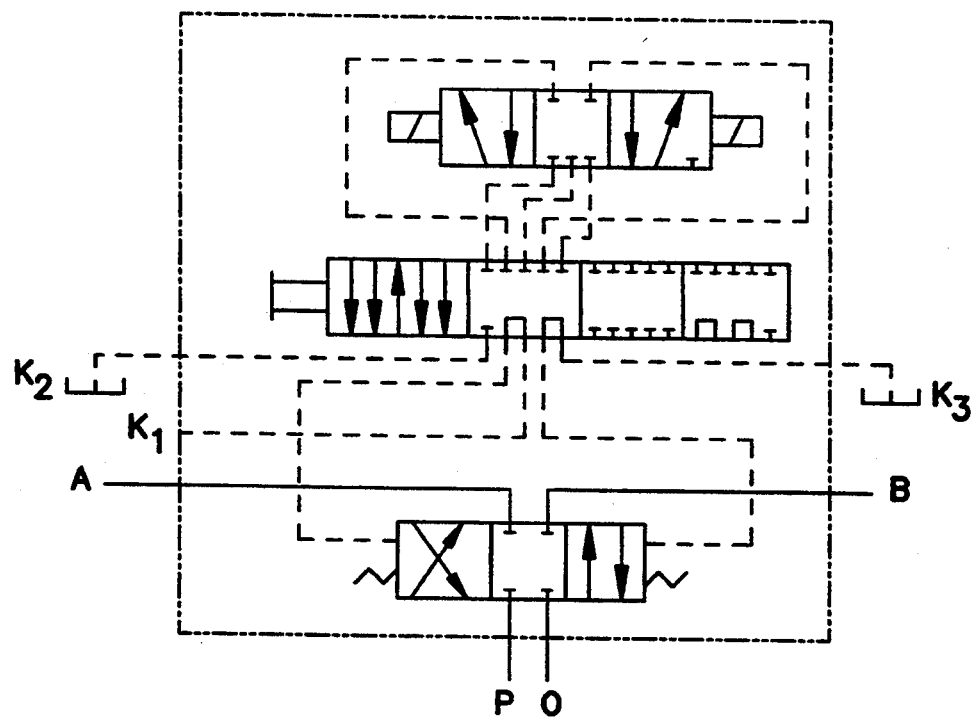
Figure 8G:
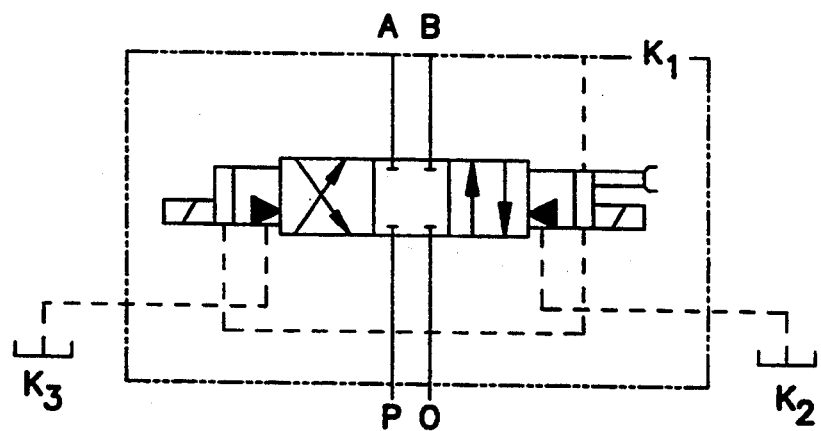

FIG. 8(f) is a schematic diagram of the eighth embodiment of the present invention using hydraulic graphic symbols to show its working principle. FIG. 8(g) is a schematic diagram of the eighth embodiment using simplified symbols.

The structural principle of the isolation valve (63) shown in this embodiment is applicable also to proportion direction and flow combination valves and servo valves in which such a structure may be even more necessary. The reason for this is that although the isolation valve cannot effect proportion control and servo control during manual operation, existing proportion valves and servo valves are very expensive, require strict ambient conditions, and are subject to trouble, while the isolation valve is simple in structure, is inexpensive, and can eliminate the need for a separate throttle valve. Hence it is advantageous to use an isolation valve in accordance with the present invention as it will add very little to the total cost, and provide convenient maintenance and emergency handling. Of course, it is suitable only in occasions where switching is not very frequent.

It is possible to design various isolation valve cores according to different median positions.

It is evident from the above description that the seventh and eighth embodiments also put forward a turning-moving type multi-channel switching plunger valve as embodied by the isolation valve core. There are a number of channel openings in its body with holes or slots formed in the plunger valve core which define channels, and guide slots which may be formed in a spiral shape, T-shape or L-shape. Turning and moving the valve core can "switch" on and off a number of channel openings simultaneously.

Figure 9A:
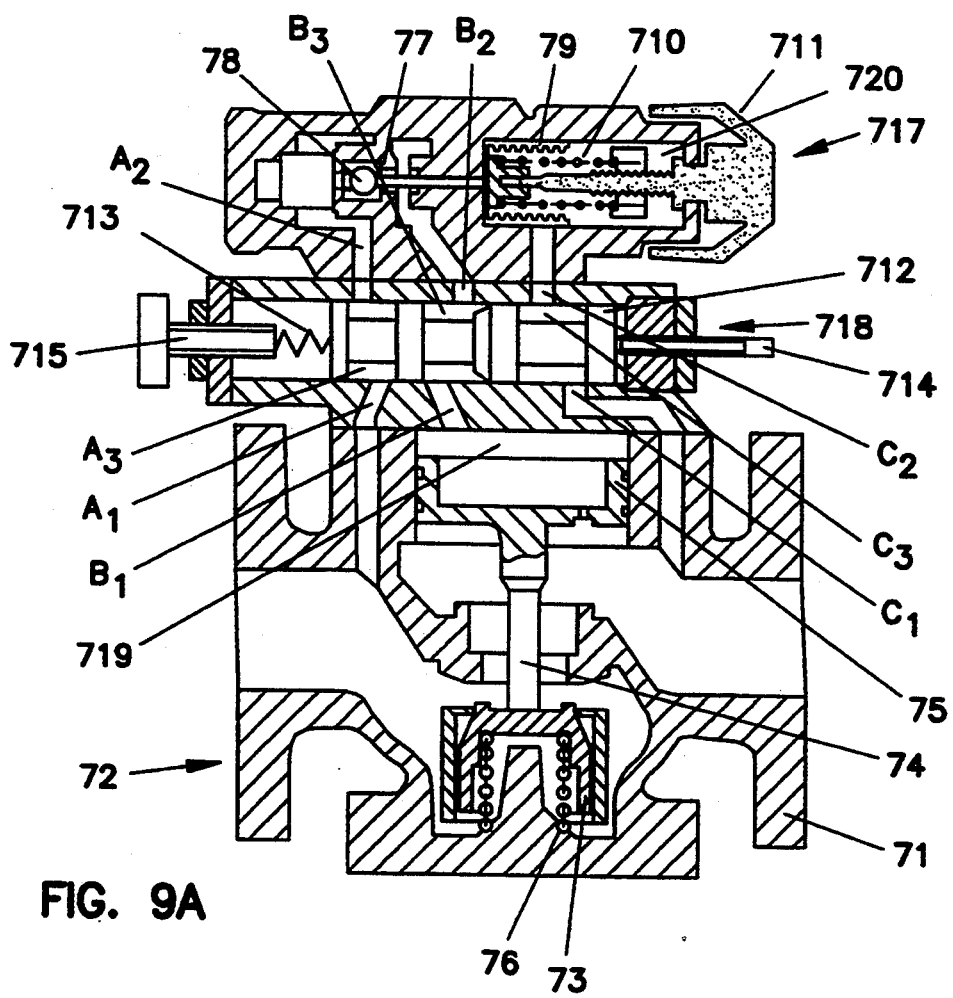
FIGS. 9(a)–9(b) are schematic diagrams of the structure and isolation principles of the ninth embodiment of the present invention, an isolation pilot type depressurization valve.

The ninth embodiment shown in FIG. 9 is a depressurization valve in the field of general purpose valves. It consists of three main portions: a main valve (72), a pilot valve (717) and an isolation valve (718). The main valve (72) primarily consists of a valve body (71), a valve clack (73), a valve stem (74), a piston (75) and a main spring (76). The pilot valve (717) consists of a pilot valve seat (77), a pilot valve clack (78), a corrugated tube (79), an adjusting spring (710) and an adjusting handle (711). The isolation valve (718) is a sliding valve which consists of an isolation valve core (712), an isolation spring (713), a push rod (714), and an adjusting screw rod (715). There are three passages $A_1A_2$, $B_1B_2$, and $C_1C_2$ between the main valve (72) and the pilot valve (717). The passage $A_1$ is connected to the inlet of main valve (72) while the passage $A_2$ is connected to the inlet of pilot valve (717). The passage $B_1$ is connected to a piston upper chamber (719), while the passage $B_2$ is connected to the outlet of pilot valve (717). The passage $C_1$ is connected to the outlet of the main valve (72) while the passage $C_2$ is connected to a corrugated tube chamber (720) in the pilot valve. There are three annular slots $A_3$, $B_3$ and $C_3$ on the isolation valve core (712)

which are normally in communication with the three passages $A_1A_2$, $B_1B_2$, and $C_1C_2$ respectively, as shown in FIG. 9(a). In this position, the depressurization valve operates normally, its basic operational principle being the same as existing depressurization valves and further description is unnecessary.

Figure 9B:
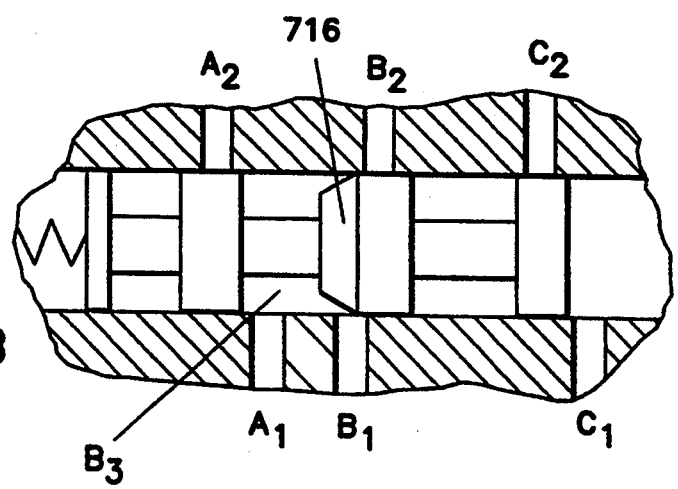
Figure 10:
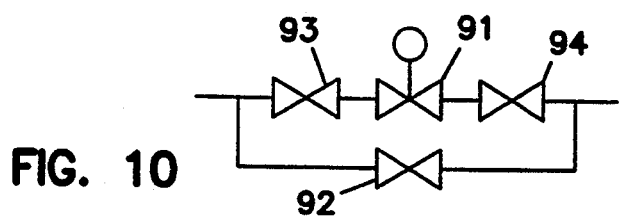
FIG. 10 is a schematic diagram of a pipeline with by-pass isolation in the field of traditional general purpose valves and instrument valves.

When pilot valve (717) requires maintenance, the push rod (714) is turned to force the isolation valve core (712) to the left, as shown in FIG. 9(b). The cylindrical surface of the isolation valve core (712) will block the openings to passages $A_2$, $B_2$, and $C_2$, and will thus isolate the pilot valve (717) so that on-line repair can be carried out. In this position, the passage $A_1$ connecting the piston upper chamber (719) communicates with passage $B_1$ by annular slot $B_3$ on the isolation valve core (712). The isolation valve core (712) has a conical surface (716) formed at the right side of annular slot $B_3$ (as shown in FIG. 9(b)) to define a throttle port with the passage $B_1$. With the isolation valve core in this position, the passage $C_1$ between the outlet of the main valve (72) and the isolation valve opens outside of the end face of the isolation valve core (712). In this way, the working medium flowing through the outlet end of the main valve can enter the chamber at the right end of the isolation valve core (712) via passage C, and the output pressure and elastic force of the isolation spring (712) will determine the axial position of the isolation valve core (712) and thus adjust the flow of working medium through passages $A_1$ and $B_1$ from the inlet of the main valve (72) to the piston upper chamber (719) due to the action of the throttling port. Hence the pressure fluctuation of the medium flowing through the outlet of the main valve will induce an up-and-down movement of the piston (75) to automatically adjust and maintain the stability of outlet pressure. By turning the adjusting screw rod (715), a preset compression of the isolation spring (713) may be varied to set the value of the outlet pressure. It is evident from the above analysis that the isolation valve (718) of this embodiment not only controls the action of the main valve (72) during normal operation of the pilot valve (717), but also can isolate the pilot valve (717) so that the pilot valve (717), but also can isolate pilot valve (717), so that the pilot valve (717) can be dismantled for repair and the isolation valve (718) itself can serve as a stand-by pilot valve. The conical surface (716) on the isolation valve core (712) may be machined into slots of other shapes so long as the throttling action may be provided.

The isolation valve of this embodiment is a sliding valve type and may be automatically controlled; therefore, there will be a slight leakage when it is being used as a stand-by pilot valve. For valves demanding very high hermetization, screw threads may be machined in the openings of the passages $A_2$, $B_2$, and $C_2$, and screw plugs (not shown in these figures) may be used to seal the passages $A_2$, $B_2$, and $C_2$ when the pilot valve (717) is dismantled.

It is evident from the description of the above nine embodiments that an automatic control valve will possess functions of isolation, switching and throttling with the addition of an isolation valve of very simple structure. The valve may act concurrently as a pressure adjusting valve seat, check valve seat and throttle valve sleeve so that when the automatic control valve or its pilot valve requires maintenance, it can still be controlled automatically or manually while on-line repair is in progress. Its advantage is very distinct. Positional change of the isolation valve core may be made by either moving the valve core longitudinally along its axis, rotating the valve core, or a combination of both, and its structure may be either a single core type or a sleeved type. In each embodiment, quite a few of these variables are interchangeable. Since the present invention is a fundamental improvement, it is applicable to many kinds of automatic control valves too numerous to mention one by one.

The moving-turning combination-type multi-way switching valve as embodied by the isolation valve put forward in the present invention is itself an independent valve the use of which is not limited to an isolation valve but will find its application in many piping systems requiring multi-way switching.

What is claimed is:

1. An isolation automatic control valve comprising an automatic main valve and a pilot valve, characterized in that said isolation automatic control valve further comprises an isolation valve; said isolation valve is disposed on a passage connecting said main valve and said pilot valve; said isolation valve comprises a valve body and a valve core; the circumference of said valve core precisely fits a bore formed in said valve body and includes channels formed therein; said valve core is moveable within said bore of said valve body; said channels, when said valve core is in a normal position, maintain said passage in fluid communication with said main valve and said pilot valve; said channels, when said valve core is displaced from said normal position, are similarly displaced and prevented from maintaining fluid communication through said passage between said main valve and said pilot valve;

wherein said isolation valve core further has apertures to maintain fluid communication between a main valve side of said passage and an outlet port of said main valve when said isolation valve is in a position to cut off the passage connecting said main valve with said pilot valve; said isolation valve being a rotary valve and said apertures of said valve core of said rotary valve including axial passages.

2. An isolation automatic control valve according to claim 1, characterized in that said isolation valve core has a hole in its axial center, and said valve core includes a lifting valve core pressed tightly by a spring at the hole end; said isolation valve core including means for adjusting the initial compression of said spring.

3. An isolation automatic control valve according to claim 1, characterized in that said isolation valve core comprises a sleeve with channels formed therein and a sleeve core slidably movable within an axial bore formed in the sleeve and forming a throttling port with the channels of the sleeve.

* * * * *

UNITED STATES PATENT AND TRADEMARK OFFICE
CERTIFICATE OF CORRECTION

PATENT NO. : 5,404,902

DATED : April 11, 1995

INVENTOR(S) : Wen

It is certified that error appears in the above-identified patent and that said Letters Patent is hereby corrected as shown below:

In column 6, line 9, "$C_1$" should read --$C_3$--.

In column 8, line 7, "P" should read --$P_3$--.

In column 8, line 23, "Pis" should read --$P_1$ is--.

In column 9, line 34, "$A_1$ and $B_1$" should read --$A_3$ and $B_3$--.

In column 9, line 35, "$B_1B_1$" should read --$B_1B_2$--.

Signed and Sealed this

Third Day of June, 1997

Attest:

BRUCE LEHMAN

*Attesting Officer*  *Commissioner of Patents and Trademarks*